(No Model.)

A. P. YATES.
VEHICLE RUNNER.

No. 359,656. Patented Mar. 22, 1887.

UNITED STATES PATENT OFFICE.

ALVAH P. YATES, OF ROCKFORD, ILLINOIS.

VEHICLE-RUNNER.

SPECIFICATION forming part of Letters Patent No. 359,656, dated March 22, 1887.

Application filed August 24, 1886. Serial No. 211,723. (No model.)

*To all whom it may concern:*

Be it known that I, ALVAH P. YATES, a citizen of the United States, residing in the city of Rockford, in the county of Winnebago and State of Illinois, have invented new and useful Improvements in Vehicle-Runners, of which the following is a specification.

This invention relates to vehicle-runners. Its object is to provide runners capable of use in connection with the wheels of a vehicle, to fit them for travel on snow or ice roads; and it consists of runners to embrace the periphery of the under portion of the forward wheels of the vehicle and extend rearward thereof to a point at or forward of a vertical line depending from the axial center of the rear wheel of the vehicle, and means for fixing the runner to the front wheels and to the rear portion of the carriage-frame, all of which, including their construction, application, and operation, will be hereinafter more fully described.

Figure 1:
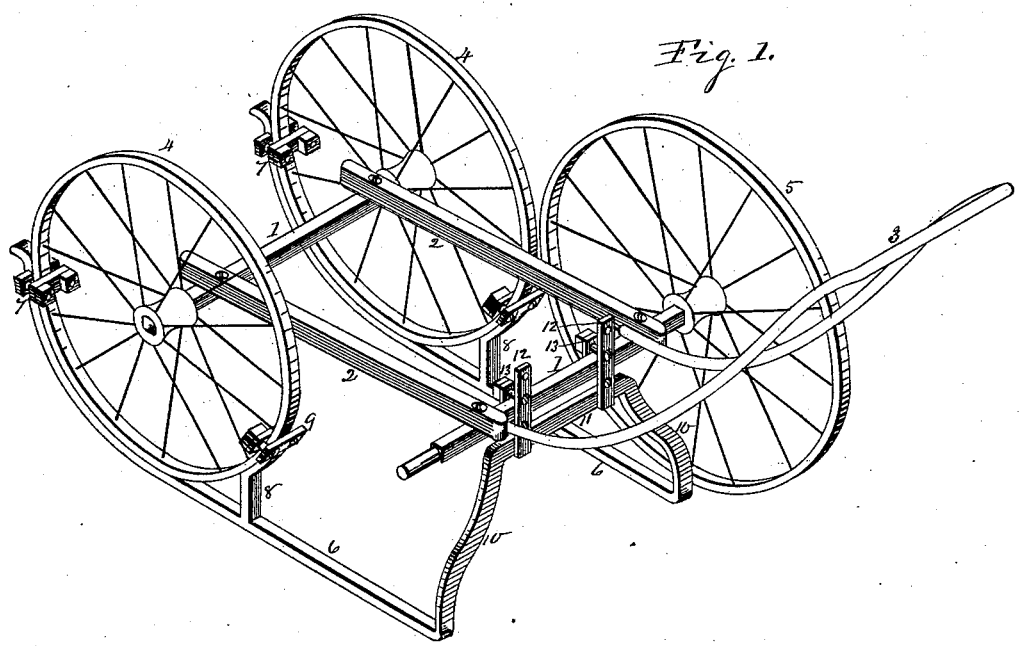
Figure 2:
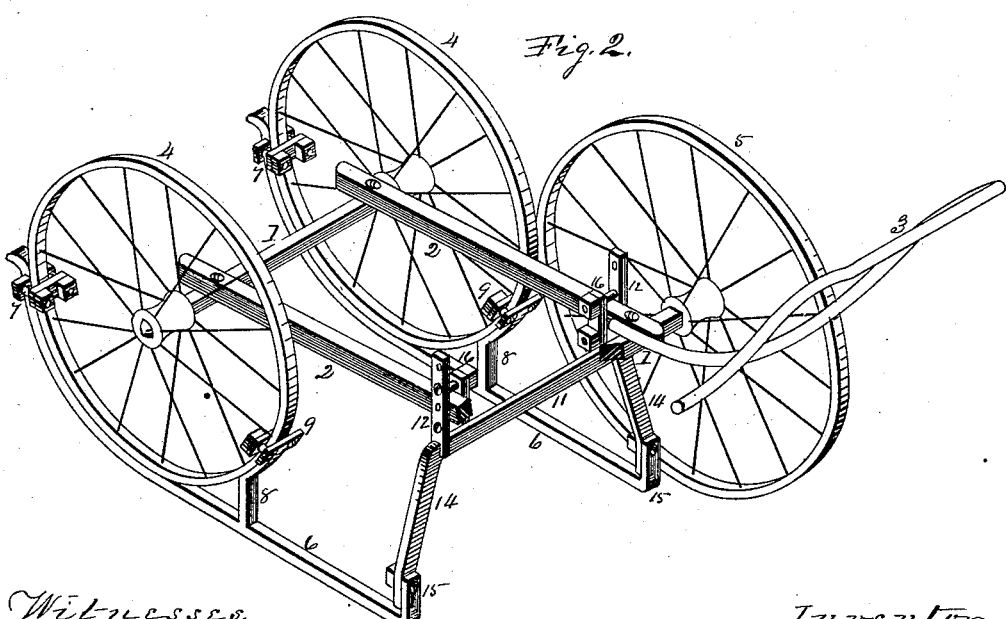

In the accompanying drawings, Figure 1 is an isometrical representation of the running-gear of a cab with my improved runners in place thereon; and Fig. 2 is also an isometrical representation of the running-gear of a cab with my improved runners in place thereon, and in which I have shown slight mechanical differences in construction and application from that shown in Fig. 1.

In both figures of the drawings a wheel is omitted and portions of other parts of the carriage-frame are broken away for the purpose of clearness all of which will be readily understood by an inspection of the figures.

The running-gear of the cab, consisting of the supporting-frame composed of the axle-tree 1, side bars, 2, and thills 3, mounted on front wheels, 4, and rear wheels, 5, which revolve on the axle-arms of the axle-tree and constitute the running-gear, and is substantially the same as like parts of like cabs or other vehicles now in use and to be found in the trade.

The runners 6 are curved at their forward end to embrace the under forward portion of the periphery of the forward wheels, and their forward upturned ends are provided with a clamping device, 7, to embrace the rim of the wheel, and are employed to fix the runner in place thereon. A brace, 8, rising from the upper face of the runner rearward of the forward wheel, engages the periphery of the rear under portion of the forward wheel, and is provided with a clamping device, 9, to embrace the rim of the wheel, and, in connection with the clamping device 7, serves to fix the runners in place on the forward wheel.

The runners, from their connection with the forward wheels, extend rearward in the line of tread of the wheels and in a plane slightly below the plane of the tread thereof to a point near or forward of a vertical line depending from the axial center of the rear wheels.

Knees 10 rise from the rear end portions of the runners and connect with the end portions of a central horizontal bench, 11, forming a knee-and-bench connection of the rear ends of the runners. Supporting-arms 12, fixed to the end portions of the bench, rise to connect with the rear axle-tree of the vehicle, and are removably fixed thereto by means of a clamping mechanism, 13, which embraces the axle-tree and serves to fix the bench to the axle-tree and support the rear portion of the vehicle on the runners. This connection of the bench with the axle-tree is capable of vertical adjustment by means of a series of holes formed in the vertical arms; or, instead of the holes, the arms may be formed with vertical slots for the purpose of adjustment; or, when the runners are designed for a particular make of vehicles, the vertical adjustment may be dispensed with. In every instance, however, it is intended that the adjustment of the runner relatively with the tread of the wheel shall be on a lower plane, to support the wheel above the tread of the runner to relieve the wheels from contact with the trackway, but in such relative position therewith that when the thills are depressed to elevate the front wheels the rear wheels will engage the trackway rearward of the runners, elevate them, and support the vehicle to roll on its rear wheel-supports, to override obstructions or bare spots that would interfere with the free movement of the vehicle on runners.

In Fig. 2 the lower ends of knees 14, depending from the bench, are detachably connected with the upturned rear end portions, 15, of the runners, and, instead of the supporting-arms rising from the bench to engage the axle-tree, they engage the side bars and are adjustably fixed and held in place thereon by clamping mechanism 16, substantially the same, in the same manner, and for the same purpose as hereinbefore described, and shown at 13, Fig. 2.

The several changes shown in Fig. 2 differing from the construction and application shown in Fig. 1 are merely mechanical, and are employed as an example of mechanical changes to which my improvement may be subjected.

I claim as my invention—

1. The combination, with the forward wheels of a vehicle and with the frame-work supported on the wheels, of runners to receive the forward wheels and their rear ends to engage the supporting-frame, said runners having a clamp-connection with the forward wheels and with the supporting-frame independent of the rear wheel, substantially as and for the purpose set forth.

2. Vehicle-runners with forward ends curved to embrace the wheel and a brace to engage the rear portion of the wheel, knees and bench-connection of their rear ends, and means, substantially as shown and described, to connect the runners with the vehicle, as and for the purpose set forth.

3. The combination, with the bench-connection of the runners and with vehicle-frame, of vertical supports rising from the bench to engage the frame of the running-gear, and clamps to connect the supports with the frame independent of the rear wheels, substantially as and for the purpose set forth.

ALVAH P. YATES.

Witnesses:
JACOB BEHEL,
A. O. BEHEL.